United States Patent [19]

Spencer

[11] Patent Number: 4,998,685
[45] Date of Patent: Mar. 12, 1991

[54] CONTAINER FOR HOLDING SPOOLS OF THIN LINE

[76] Inventor: Donald R. Spencer, Rte. 1, Box 181, Grafton, Ill. 62037

[21] Appl. No.: 279,832

[22] Filed: Dec. 5, 1988

[51] Int. Cl.⁵ ........................ B65H 49/18; B65D 85/00
[52] U.S. Cl. .................................... 242/137; 242/134; 242/138; 242/137.1; 206/409
[58] Field of Search ................... 242/83, 96, 129, 134, 242/138, 146, 55.53, 137, 137.1, 106; 206/391, 394, 407, 409, 413–416; 43/25.2, 54.1

[56] References Cited

U.S. PATENT DOCUMENTS

| | | | |
|---|---|---|---|
| 706,697 | 8/1902 | Sims | 242/96 |
| 1,256,443 | 2/1918 | Demmien | 242/137 X |
| 2,029,975 | 2/1936 | Winchester | 242/129 |
| 2,517,866 | 6/1976 | Glahn | 242/137.1 |
| 2,798,597 | 7/1957 | Thompson | 242/55.53 |
| 3,602,455 | 8/1971 | Lewis | 242/138 X |
| 3,962,815 | 6/1976 | Christensen | 242/137.1 X |
| 4,026,063 | 5/1977 | Allen et al. | 73/54.1 |
| 4,141,478 | 2/1979 | Dennison | 242/137.1 X |
| 4,664,260 | 5/1987 | Stokes | 242/129 X |
| 4,787,168 | 11/1988 | Benit | 242/106 X |

FOREIGN PATENT DOCUMENTS 286145 3/1928 United Kingdom ............... 242/134

Primary Examiner—Daniel P. Stodola
Assistant Examiner—Paul Thomas Bowen
Attorney, Agent, or Firm—Gravely, Lieder & Woodruff

[57] ABSTRACT

A container for dispensing thin line, such as tippet material used for fishing, includes a housing having a flat end wall and a cylindrical peripheral wall which together define a cavity for holding several spools of the line. The lines pass from their respective spools through a slit in the peripheral wall. The slit has elastomeric liners along its edges, and these liners serve to grip the line, so that its ends are presented for gripping beyond the container. The housing also has a spindle which projects from the end wall of the housing through the spools, beyond which it has a screw thread. An end plate extends across the cavity where it opens out of the housing, this plate being attached to the housing at the screw threads on the spindle so that it can be turned down to clamp the spools between it and the end wall of this housing. This controls the resistance with which the spools will rotate when dispensing line. The end wall of the housing contains a threaded socket to which a lanyard-type holder or another housing may be attached.

20 Claims, 2 Drawing Sheets 4,998,685

CONTAINER FOR HOLDING SPOOLS OF THIN LINE

BACKGROUND OF THE INVENTION

This invention relates in general to containers and more particularly to a container for holding spools of thin line, such as tippet material, such that the line is easily dispensed.

The typical fly fisherman at the end of his fishing line uses a thin monofilament line, called a tippet, to attach the fly to the line. The tippet is difficult to observe in the water and thus presents the fly as an isolated insect in the water. Fishing tackle firms supply tippet material on thin spools and in varying diameters, with each spool holding about 20 meters of the material.

Unless restrained, the tippet material of a spool will uncoil and tangle. Moreover, withdrawing tippet material from the spool is not easy, for one must hold the spool, control the material as it pays off, prevent the material from unwinding excessively, cut the material to provide a tippet, and then secure the remaining material to the spool, all in essentially one undertaking. Keeping several different spools and the tippet material on them separate is another annoyance encountered by the fisherman.

The present invention resides in a container for holding several spools of thin, highly flexible line, and for further presenting the lines of those spools so that they may be grasped and easily withdrawn to provide shorter segments for use as tippets.

DESCRIPTION OF THE DRAWINGS

In the accompanying drawings which form part of the specification and wherein like numerals and letters refer to like parts wherever they occur -

DETAILED DESCRIPTION

Figure 1:
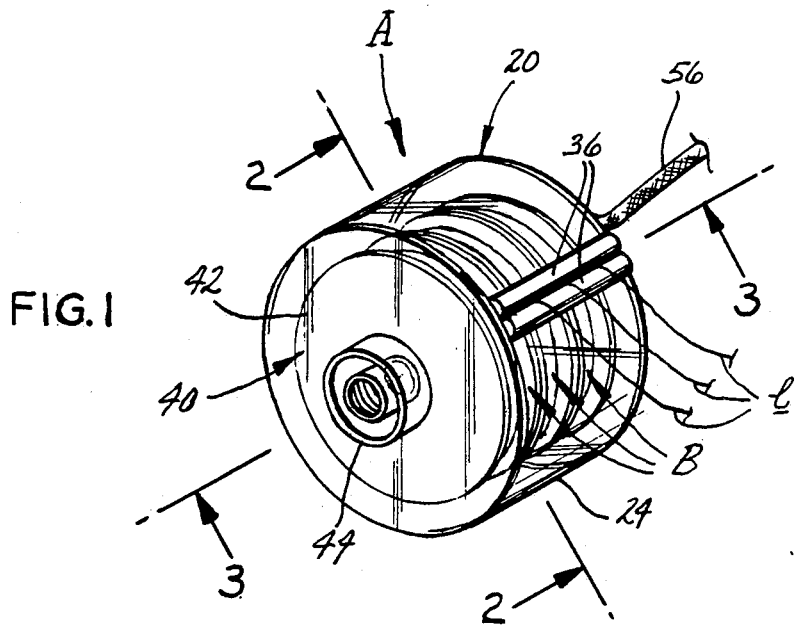
FIG. 1 is a perspective view of a container constructed in accordance with and embodying the present invention, with the container holding several spools of tippet material.
Figure 2:
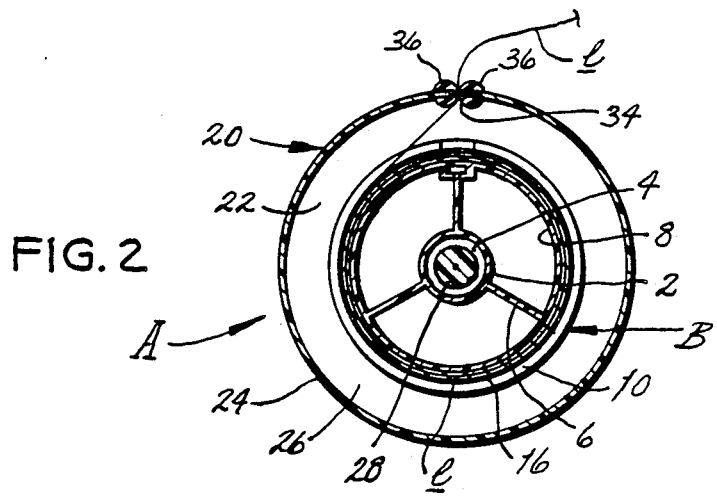
FIG. 2 is a sectional view taken along line 2—2 of FIG. 1.
Figure 3:
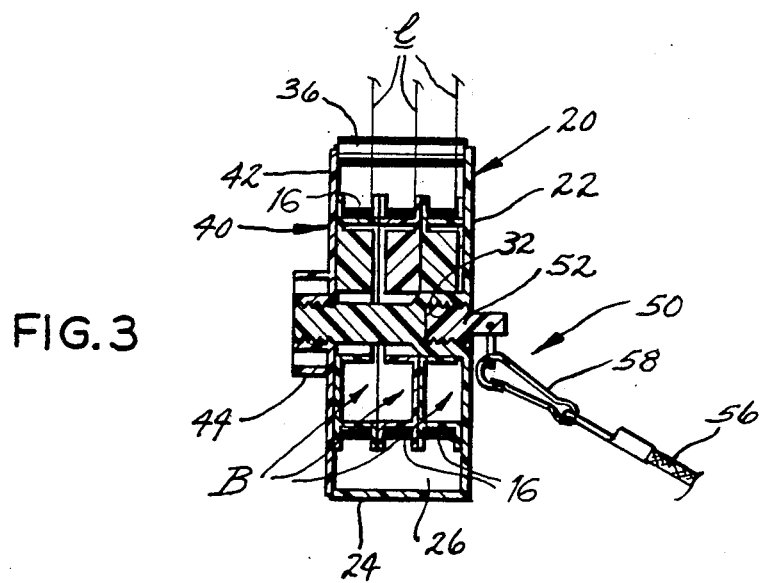
FIG. 3 is a sectional view taken along line 3—3 of FIG. 1.
Figure 4:
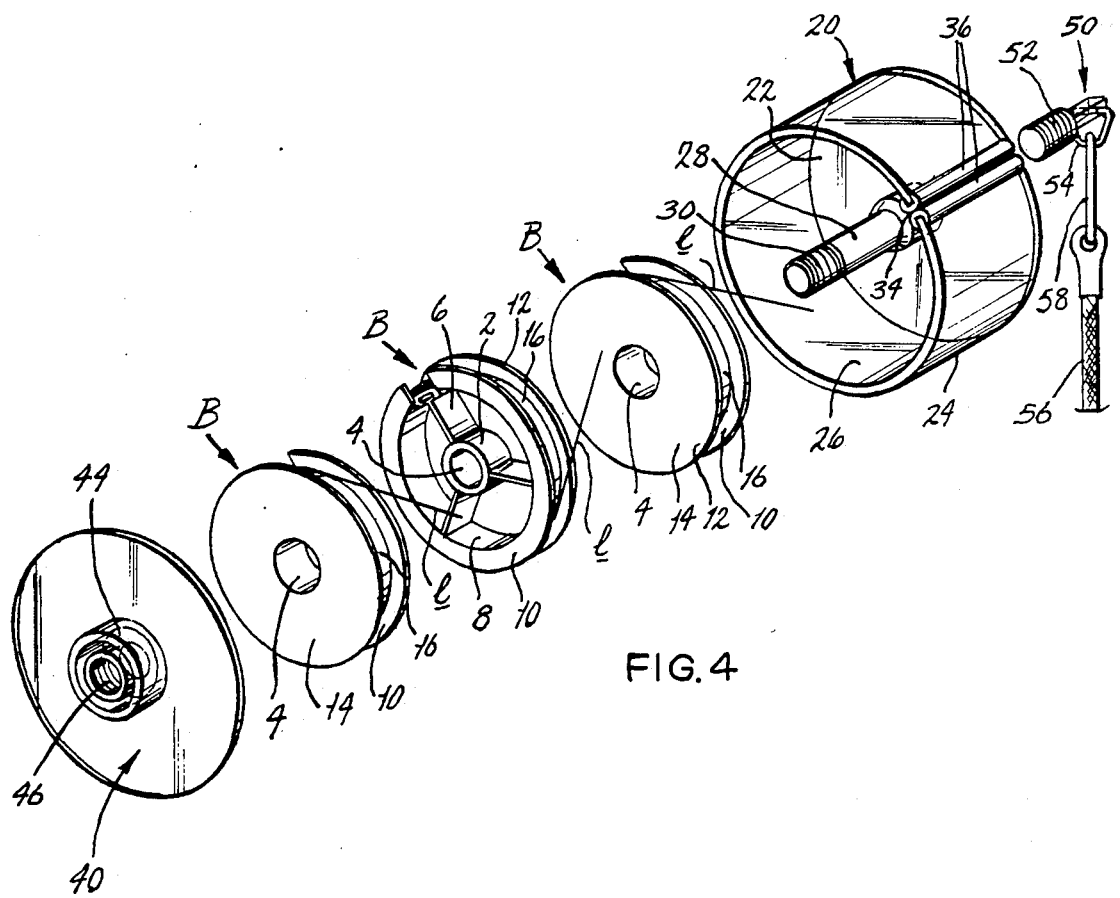
FIG. 4 is an exploded perspective view of the container and its spools.

Referring now to the drawings, a container A (FIGS. 1 & 4) holds several, preferably three, spools B of thin monofilament line 1, known as tippet material, and further presents the ends of those lines 1 at the exterior of the container A so that a line 1 from any one of the several spools B may be withdrawn. While the container A permits the spools B to rotate within its interior, it imparts a frictional resistance to them, and this prevents the spools B from rotating freely. As a consequence, the lines 1 do not uncoil from their spools B when they are within the container A. Moreover, the frictional resistance may be adjusted or controlled.

The spools B are typical of those on which monofilament line 1, or tippet material is supplied. Each includes (FIG. 4) a hub 2 having a bore 4 and several spokes 6 which radiate from the hub 2. The spokes 6 at their outer ends are attached to a drum 8 which in turn has flanges 10,12 projected radially from it. Both flanges 10,12 have end faces which lie perpendicular to the axis of the hub 2 and its bore 4. While the flange 10 extends no farther inwardly than the drum 8, thus leaving the space between the hub 4 and drum 8 essentially hollow, the flange 12 extends inwardly to the hub 2 in the form of a closure 14 that closes one end of the spool B. The closure 14 serves as a surface for applying a label to the spool B. In any event, the two flanges 10,12 constitute end walls which present friction surfaces that are perpendicular to the axis of the spool B. Spools of slightly different configuration are also suitable for dispensing tippet material from the container A.

Each spool B comes with the line 1 wound around its drum 8 in the space between the two flanges 10,12, and of course the flanges 10,12 keep the line 1 from slipping off the sides of the drum 8. To keep the line from unwinding from the drum 8, one of the flanges 10 or 12 may be notched or provided with some other device for securing the end of the line 1. This securing device is not necessarily required when the spool B is in the container A, because the container both retards rotation of the spool B and secures the end of the line 1. Nevertheless, when the spool B is loaded into the container A it is desirable to provide some means for physically holding the line 1 around the drum 8, and to this end a rubber band 16 is stretched around the line 1 that is wound around the drum 8. The rubber band 16 is flat in cross-section and only slightly narrower than the space between the two flanges 10,12.

Figure 5:
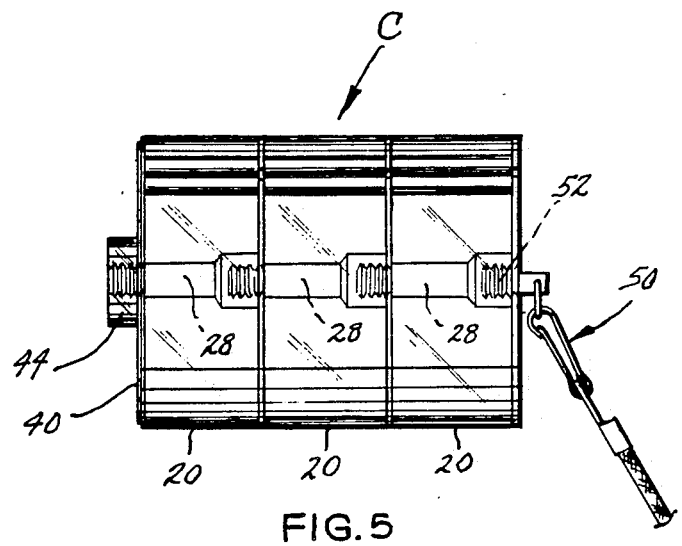
FIG. 5 is a side elevational view of a modified container.

Turning now to the container A itself, it includes (FIG. 1-4) a cup-like housing 20 having a flat end wall 22 of circular shape and a peripheral wall 24 of cylindrical shape formed integral with end wall 22 at the periphery of that wall so as to enclose a cylindrical cavity 26. The diameter of the cavity 26 exceeds that of the spools B measured at the peripheries of the flanges 10,12, while its depth is only slightly less than the combined thickness of a predetermined number of spools B, preferably three, stacked one upon the other. At the center of its cavity 26, the housing 20 has a spindle 28 which projects axially from the end wall 22 and thus lies parallel to the peripheral wall 24. The length of the spindle 28 exceeds the axial dimension of the peripheral wall 24, so that the spindle 28 extends completely through the center of the cavity 26 and beyond the free edge of the peripheral wall 24 where it is provided with male screw threads 30. The largest diameter of the spindle 28 is less than the diameter of the bores 4 in the hubs 2 of the spools B. At the opposite end of the spindle 28 where it merges with the end wall 22, the spindle 28 is itself hollow, with its hollow interior opening out of the end wall 22 in the form of a socket 32 which is provided with a female screw thread having the same diameter, direction and pitch as the male thread 30. This permits two housings 20 to be attached to one another with one forming an axial extension of the other (FIG. 5). More specifically, the male thread 30 on the end of the spindle 28 for one housing 20 is engaged with the threaded socket 32 that opens out of the end wall 22 of another housing 20, and the two housings 20 are rotated relative to each other to bring them together.

The peripheral wall 24 contains an axially directed slit 34 which is slightly wider at the end wall 22 than it is at the free margin of the wall 24, the slit 34 tapering downwardly between the two. The slit 34 is closed by a pair of liners 36 which are formed from an elastomeric material and are engaged with the peripheral wall 24 along the edges of the slit 34. Rubber tubing slit axially and spread to fit over the margins of the slit 34 functions well for this purpose. The two liners 36 normally bear against each other to close the slit 34, but they and the wall 24 on which they are mounted will flex enough to enable lines 1 from several spools B to pass between them. Nevertheless, the liners 36 close upon and grip the lines 1 which are so fitted, and thus present those lines 1 immediately beyond container A so that they may be easily gripped. This further impedes rotation of the spools B from which the lines 1 extend, at least in the direction which draws the lines taut.

In addition, the container A in its most basic configuration, includes an end plate 40 (FIGS. 1, 3 & 4) which includes another flat end wall 42 of circular configuration, its diameter being equal to that of the outside diameter for the peripheral wall 24 of the housing 20. At the center of its end wall 42, the plate 40 has a cylindrical boss 44 which projects axially from one surface of the wall 42, yet is hollow and opens out of the other surface of the wall 42. Here the plate 40 is provided with a bore 46 containing a screw thread which is likewise the same diameter, direction and pitch as the thread 30 on the end of the spindle 28 for the housing 20. The plate 40 is attached to the housing 20 to close the open end of the cavity 24, simply by engaging the female thread of its bore 46 with the male thread 30 on the end of the spindle 28 for the housing 40 and then turning the end plate 40 down until the end wall 42 along its periphery approaches the free edge of the peripheral wall 24 for the housing 20. When the plate 40 is so engaged with the housing 20, the boss 44 on the plate 40 projects away from the housing 40 and provides a surface for both gripping and turning the plate 40.

Actually, the plate 40 is not turned down all the way to the edge of the cylindrical wall 24, but instead is turned down against the endmost spool B with enough force to lightly clamp the several spools B between the end wall 22 of the housing 20 and the end wall 42 of the plate 40; yet the force is not so great as to prevent rotation of the spools B in the housing 20. In this regard, the several spools B are fitted into the cavity 26 of the housing 20, one over the other, such that the bores 4 of their hubs 2 receive the spindle 28 of the housing 20. As each spool B is inserted into the housing 20, the leader from the line 1 which is coiled about its drum 8 is fitted between the two liners 36 in the slit 34 of the cylindrical wall 24. The liners 36 grip that leader. Moreover, the spools B are arranged alternately, that is with like flanges 10 and 12 together. In other words, the flange 10 of any spool B located between two other spools B will have its flange 10 against the flange 10 of the spool B on one side of it and its flange 12 against the flange 12 of the spool B on the other side of it. This causes the lines 1 to extend from adjacent spools B into the slit 34 from opposite directions. Thus, when the line 1 from one spool B is withdrawn from the container A, that spool B will of course rotate, and the rotation, by reason of the frictional contact with each adjacent spool B, exerts a torque on the adjacent spool B. That torque tends to draw the line 1 of the adjacent spool B back into the container A but that line 1 remains fixed in the grip of the liners 36 at the slit 34 of the housing 20, and thus no rotation of the adjacent spool B occurs. In other words the liners 36 grip the lines 1 extending from the nonrotating spools B with enough force to prevent those spools B from rotating. The line 1 from the adjacent spool B does remain taut between the liners 36 and the spool B.

In addition to the housing 20 and end plate 40, the container A also includes a holder 50 (FIGS. 3 & 4) for suspending the housing 20 and the spools B contained within it from a fisherman's garment or some other support. The holder 50 includes a threaded stud 52 having a male thread which matches the female thread of the socket 32 at the center of the end wall 22. Indeed, the stud 52 threads into the end wall 22, and when so attached, projects beyond the end wall 42 where it is provided with a ring 54. The holder 50 also includes a lanyard 56 having clips 58 at each of its ends. One of the clips 58 connects with the ring 54 on the stud 52, while the other is attached to a hook or some other device on a garment worn by the user, thus suspending the container A from the user's garment where the user may easily withdraw the line 1 from any one of the spools B held within the container A.

The housing 20, end plate 40 and stud 52 are preferably formed from a transparent polymer, such as polycarbonate, by injection molding.

To load the spools B into the container A, the end plate 40 is removed from the housing 20 simply by rotating it counterclockwise with respect to the housing 20. In this regard, the end plate 40 is easily grasped at its boss 44 and turned. The line 1 on each spool B is then detached from that which secures it to one of the flanges 10 or 12, and a rubber band 16 is placed around the coiled line 1 to prevent it from uncoiling and falling off of the spool B. The band 16 should hold all of the line 1 coiled tightly about the drum B, except for a short leader of perhaps several inches. With the spools B so prepared, they are inserted one after the other into the cylindrical cavity 26 of the housing 20, each passing over the spindle 28 that projects through the cavity 26 so that the spindle 28 extends through the bores 4 in the hubs 2 of the several spools B. In this regard, the spindle B is small enough to fit through the bores 4 in the spools B of a wide variety of line suppliers. As each spool B is inserted into the cavity 26, the leader from the line 1 coiled about that spool B is inserted between the two elastomeric liners 36 that occupy the slit 34 in the cylindrical wall 24 of the housing 20. Moreover, the spools B are installed such that the lines 1 of adjacent spools B come off the drums 8 of their respective spools B from opposite directions. This is achieved simply by placing like flanges 10,12 of adjacent spools B against each other. For example, the first spool B may be installed with its flange 10 against the end wall 22 of the housing 20 and its flange 12 presented toward the open end of the cavity 26. The second spool B is installed with its flange 12 against the flange 12 of the first spool B and its flange 10 presented toward the open end. The third spool B is inserted with its flange 10 against the flange 10 of the second spool B and its flange 12 at the open end of the cavity 26. Once all three spools B are in the housing 20 with the leaders from their lines B fitted between the two liners 36 that occupy the slit 34, the threads in the bore 46 of the end plate 40 are engaged with the threads 30 on the end of the spindle 28, and the end plate 40 is rotated until its end wall comes against the outwardly presented flange 10 or 12 of the endmost spool B. This rotation is easily imparted simply by gripping the end plate 40 by its boss 44 and rotating it. Enough torque is applied to the end plate 40 to lightly clamp the three spools B between the end wall 22 of the housing 20 and the wall 42 of the plate 40. The clamping force prevents the spools B from rattling or turning freely within the cavity 26 of the housing 20.

To withdraw enough line 1 to provide a tippet, the user simply selects the line 1 of the diameter desired and pulls it through the slit 34 in the housing 20. The elastomeric liners 36 offer some resistance to the withdrawal as does the friction resulting from adjacent spools B, and as a consequence, the line 1 remains taut between the spool B and the user's fingers. This tends to straighten the line 1. As the line 1 pays off the spool B, it deflects the rubber band 16 that is around the drum 8 of that spool B and further rotates the spool B. This rotation exerts a torque on each adjacent spool B, with the direction of that torque being such that it maintains the leader for the line 1 from each adjacent spool B taut between that spool and the liners 36 that occupy the slit 34. Even so, the torque is not enough to overcome the gripping force exerted by the liners 36 on the lines 1 that extend from each adjacent spool B, and as a consequence the adjacent spool B does not rotate.

If the width of the several spools B in housing 40 is less than the depth of the housing 40, an annular spacer may be used to make up the differences. Indeed, a spacer may be substituted for one of the spools B, should the user desire not to utilize the full spool-holding capacity of the housing 40.

Decals or other marking may be applied to the cylindrical wall 24 adjacent the locations where the tippet material emerges from the slit 34 to designate the size of the tippet material.

Where the fisherman requires more than three spools B of line 1, perhaps to have a greater variety of sizes, he may connect two or more housings 20 together end-to-end to create a modified container C (FIG. 5). In this regard the thread 30 on the free end of the spindle 28 for any housing 20 will not only engage the threads in the bore 46 of the end plate 40, but will also engage the thread in the socket 36 that opens out of the end wall 22 of another housing 20. Thus, the otherwise open end of the one housing 20 is closed by the end wall 22 of the other housing 20 and the otherwise open end of the other housing 20 may be closed by still another housing 20, or by the end plate 40, depending on how many housings 20 one desires to connect end-to-end. In that sense, the container C is modular, with each housing 20 constituting a module. In any event, the end plate 40 exists at one end of the container C, it being threaded over the threads 30 on the spindle 28 for the housing 20 at that end, while the holder 50 is at the other end, its stud 52 being threaded into the socket 32 for the housing 20 at that end. The clamping force for the spools B that are in a housing 20 that is closed by another housing is adjusted by rotating the two housings 20 relative to each other.

This invention is intended to cover all changes and modifications of the example of the invention herein chosen for purposes of the disclosure which do not constitute departures from the spirit and scope of the invention.

What is claimed is:

1. A container for holding a plurality of spools, each having a line wound around it, said container comprising: a housing having a flexible peripheral wall which surrounds a cavity and an end wall which extends across one end of the cavity and is connected to the peripheral wall at one end of the peripheral wall, the cavity being configured to hold the plurality of spools arranged coaxially, the peripheral wall having a free edge remote from the end wall and further having a slit extending between end wall and the free edge, the slit being provided with edges; elastomeric liners located along the edges of the slit where they are fitted to the peripheral wall, both the liners and peripheral wall being flexible enough to grip and hold lines extended through the slit, the liners being tubes which are slit axially for their full lengths to receive the edges along the slit; an end plate connected to the housing and extending crosswise at the opposite end of the cavity so as to prevent spools from coming out of the end of the cavity at which it is located; and restraining means for urging the end plate toward the end wall of the cavity so as to exert a light clamping force in the spools arranged coaxially in the cavity between the end plate and end wall and thereby retard rotation of the spools within the cavity.

2. A container according to claim 1 wherein the restraining means further includes a threaded element extended between the end plate and the end wall of the housing, with the end plate being connected to the end wall of the housing through the threaded element such that rotation of the end plate relative to the housing will vary the distance between the end plate and the end wall of the housing, whereby the clamping force can be varied by rotating the end plate relative to the housing.

3. A container according to claim 1 wherein the restraining means includes a spindle which projects from the end wall through the cavity and is engaged with the end plate.

4. A container according to claim 1 wherein the spindle and end plate are connected by threads.

5. A container according to claim 1 and further comprising means for attaching the housing to a garment.

6. A container according to claim 5 wherein the means for attaching includes a threaded stud which threads into the end wall of the housing and a lanyard attached to the stud.

7. A container according to claim 1 wherein the end wall closes one end of the cavity in the housing and the end plate closes the other end of the cavity.

8. The container according to claim 7 wherein the peripheral wall is cylindrical and the slit extends substantially the full length of that wall.

9. A container for holding a plurality of spools around each of which a line is coiled, said container comprising: a housing having a flat end wall which is circular and contains a threaded socket that opens out of the exterior of the housing and a cylindrical peripheral wall which at one end is formed integral with the end wall and at its other end has a free edge so that the end and peripheral walls together define a cavity that is large enough to receive the plurality of spools stacked one upon the other generally in axial alignment, the peripheral wall being flexible and having a slit through which lines from the spools may pass, with the slit extending essentially from the end wall to the free edge, the housing also having a spindle which is axially aligned with the socket and projects through the cavity generally at the center thereof and is provided with a screw thread at its end; a circular end plate attached to the spindle at the screw thread thereof and being extended across the housing to close the end of the cavity that is opposite from the end wall of the housing, whereby when the end plate is turned down on the spindle, it will clamp spools that are within the cavity between the end plate and the end wall, thereby restraining rotation of such spools in the housing; and elastomeric liners fitted to the peripheral wall along the edges of the slit and normally bearing against each other to close the slit, the liners and peripheral wall being flexible enough to enable lines from the spools to be fitted between the liners, whereby the liners grip and hold the lines and further comprising: another housing attached to the housing to which the end plate is attached, with the spindle of the other housing being threaded into the socket that opens out of the end wall of the housing to which the end plate is attached.

10. A container according to claim 9 and further comprising a threaded stud engaged with the threads of the socket in the end wall of the housing and a lanyard attached to the stud.

11. The container according to claim 9 in the end plate is provided with a cylindrical boss where it threads over the spindle, with the boss projecting away from the cavity to serve as a convenient location for gripping and rotating the end plate.

12. The combination comprising the container of claim 11 and a plurality of spools in the cavity housing where they encircle the spindle, with each spool being in frictional contact with another spool, one of the spools further being in frictional contact with the end wall of the housing and another of the spools being in frictional contact with the end plate, the line on each spool being extended from the spool and through the slit in the peripheral wall beyond which it is presented for gripping.

13. The combination according to claim 12 where the lines on adjacent spools leave their respective spools from opposite directions.

14. The combination comprising: a housing having a flexible peripheral wall which surrounds a cavity and an end wall joined to the peripheral wall and extending across one end of that cavity, the peripheral wall having a free edge remote from the end wall and further having a slit which extends essentially from the end wall to the free edge out of which it opens, with the slit being provided with edges; an end plate connected to the housing and extended across the opposite end of the cavity; a plurality of spools stacked generally coaxially within the cavity between the end wall and the end plate, each spool having a line wound around it, with the end of the line being withdrawn from the spool and extended through the slit in the peripheral wall of the housing; a spindle extending through the spools and between the end wall and the end plate, the spindle being connected to the end wall and plate such that the stack of spools is lightly clamped between the end wall and end plate to retard rotation of the spools in the cavity; and elastomeric liners in the form of axially slit tubes extending along the edges of the slit for substantially the entire lengths of those edges, the flexibility of the liners together with the flexibility of the peripheral wall being sufficient to enable the liners to grip and hold the lines that extend from the spools through the slit.

15. The combination according to claim 14 wherein the lines on adjacent spools leave their respective spools from opposite directions.

16. The combination according to claim 14 wherein the spindle carries threads which cause the end plate to move toward or away from the end wall when relative rotation occurs between the end wall and end plate.

17. The combination according to claim 16 wherein the spindle is secured firmly to the end wall of the housing and the end plate is engaged with the spindle at the threads.

18. The combination according to claim 14 wherein the edges of the slit are slightly further apart at the end wall than at the free edge.

19. The combination according to claim 14 wherein the peripheral wall is formed integral with the end wall.

20. The combination according to claim 14 wherein the liners normally bear against each other to close the slit in the peripheral wall.

* * * * *

UNITED STATES PATENT AND TRADEMARK OFFICE
CERTIFICATE OF CORRECTION

PATENT NO. : 4,998,685
DATED : Mar. 12, 1991
INVENTOR(S) : Donald R. Spencer

It is certified that error appears in the above-identified patent and that said Letters Patent is hereby corrected as shown below:

Title page, under References Cited, patent of Dennison should read number 4,141,479 instead of 4,141,478 as shown.

Claim 4 should depend from claim 3 instead of claim 1.

Claim 11, line 1, delete "in" and insert in its place --- wherein ---.

Claim 12 should depend from claim 9 instead of claim 11.

Signed and Sealed this

Fourteenth Day of July, 1992

Attest:

DOUGLAS B. COMER

*Attesting Officer*   *Acting Commissioner of Patents and Trademarks*